United States Patent
Liu et al.

(10) Patent No.: US 9,218,360 B2
(45) Date of Patent: Dec. 22, 2015

(54) USER-SELECTED TAGS FOR ANNOTATING GEOGRAPHIC DOMAINS CONTAINING POINTS-OF-INTEREST

(75) Inventors: Weili Liu, Bellevue, WA (US); Xin Liu, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 243 days.

(21) Appl. No.: 12/636,215

(22) Filed: Dec. 11, 2009

(65) Prior Publication Data
US 2011/0143775 A1    Jun. 16, 2011

(51) Int. Cl.
*H04W 24/00* (2009.01)
*G06F 17/30* (2006.01)
*H04W 4/02* (2009.01)

(52) U.S. Cl.
CPC ......... *G06F 17/30241* (2013.01); *H04W 4/021* (2013.01); *H04W 4/028* (2013.01)

(58) Field of Classification Search
CPC ....... H04W 4/04; H04W 48/04; H04W 40/20; H04W 4/02
USPC .............. 455/456.1, 456.3; 705/319; 370/338
See application file for complete search history.

(56) References Cited

U.S. PATENT DOCUMENTS

| | | | |
|---|---|---|---|
| 7,020,494 | B2 | 3/2006 | Spriestersbach et al. |
| 2003/0148775 | A1 | 8/2003 | Spriestersbach et al. |
| 2007/0032244 | A1* | 2/2007 | Counts et al. ............. 455/456.1 |
| 2007/0165812 | A1 | 7/2007 | Lee et al. |
| 2007/0282621 | A1 | 12/2007 | Altman et al. |
| 2008/0052407 | A1 | 2/2008 | Baudino et al. |

(Continued)

FOREIGN PATENT DOCUMENTS

| | | |
|---|---|---|
| CN | 101005536 A | 7/2007 |
| CN | 101093481 A | 12/2007 |
| CN | 101237474 A | 8/2008 |

OTHER PUBLICATIONS

Jonsson, Martin, "Using a Folksonomy Approach for Location Tagging in Community Based Presence Systems", Retrieved at << http://ieeexplore.ieee.org/stamp/stamp.jsp?tp=&arnumber=4417171 >>, Second International Workshop on Managing Context Information and Semantics in Mobile Environments, May 1, 2007, pp. 304-308.

(Continued)

*Primary Examiner* — Marcos Batista
(74) *Attorney, Agent, or Firm* — Bryan Webster; Judy Yee; Micky Minhas (57) ABSTRACT

A location-based service is provided that allows a user of a mobile device to tag and track the places he or she visits and share these places with social networking members. To implement this service a system receives location information from the user's location-aware mobile device over a wireless network. The location information identifies various locations or other points-of-interest that the user has visited. Based on this information the system determines a geographical domain that encompasses at least some of the locations the user has visited. Once a geographic domain has been determined it is presented to the user via the mobile device. The user is prompted to tag the geographical domain with an annotation that describes the geographic domain. The system stores the geographical domain and the annotation associated therewith so that it can be searched and accessed or retrieved by the user or members of the user's social network.

15 Claims, 5 Drawing Sheets

(56) References Cited

U.S. PATENT DOCUMENTS

| | | | |
|---|---|---|---|
| 2008/0208973 A1 | 8/2008 | Hayashi et al. | |
| 2008/0248815 A1* | 10/2008 | Busch | 455/456.5 |
| 2009/0005987 A1* | 1/2009 | Vengroff et al. | 701/300 |
| 2009/0012953 A1 | 1/2009 | Chu et al. | |
| 2009/0082038 A1 | 3/2009 | McKiou et al. | |
| 2009/0210480 A1 | 8/2009 | Sivasubramaniam et al. | |
| 2009/0324137 A1* | 12/2009 | Stallings et al. | 382/306 |
| 2011/0029474 A1 | 2/2011 | Lin | |

OTHER PUBLICATIONS

Bentley, et al., "Flexible Views: Annotating and Finding Context-Tagged Mobile Content", Retrieved at << http://groups.ischool.berkeley.edu/pics/papers/Bentley_Metcalf_flexible_views_pics06.pdf >>, Proceedings of the seventeen ACM international conference on Multimedia, Oct. 19-24, 2009, pp. 3.

Frank, et al., "A Hybrid Preference Learning and Context Refinement Architecture", Retrieved at << http://www.aisb.org.uk/convention/aisb09/Proceedings/PERSIST/FILES/FrankK.pdf >>, pp. 7.

Hu, et al., "Project", Retrieved at << http://sparkle.cs.hku.hk/~hyhu/wiki/index.php/Project >>, IFIP International Conference on Embedded and Ubiquitous Computing, Dec. 17-20, 2007, pp. 5.

Sakkopoulos, Evangelos, "Semantic Technologies for Mobile Web and Personalized Ranking of Mobile Web Search Results", Retrieved at << http://www.mtsr.ionio.gr/proceedings/sakkopoulos.pdf >>, pp. 17.

"First Office Action and Search Report Issued in Chinese Patent Application No. 201010592086.3", Mailed Date: Mar. 24, 2014, 18 Pages. with English language translation.

* cited by examiner

USER-SELECTED TAGS FOR ANNOTATING GEOGRAPHIC DOMAINS CONTAINING POINTS-OF-INTEREST

BACKGROUND

A wide variety of mobile devices have reached the market in the past few years which take advantage of new technologies and standardizations. For example, many mobile phones come equipped with web browsers to allow users to perform such tasks as purchasing goods, checking on the status of deliveries, and booking travel arrangements. Mobile devices include any device capable of providing data processing and/or communication services to a user outside of the office. Mobile devices may include, for example (but are not necessarily limited to), personal digital assistants (PDAs), mobile phones, laptops, pagers, and wireless email devices (e.g., Blackberry™).

Because of the large demand for wireless voice and data services, service providers strive to offer new services to current and potential customers. Some exemplary services are text messaging, digital pictures, web browsing, etc. A new trend for service providers is to provide location-based services. Such services are typically offered to location-aware mobile devices, which can determine their own geographic locations using a Global Positioning System (GPS), for example. The location-based services provide information to a mobile user based on the location of the mobile user. For instance, a location-based service may send informational text messages to the user's mobile device, such as information on the weather, information concerning traffic, advertisements, etc., based on the location of the user. Another location-based service allows a user to identify and/or communicate with other individuals, groups and businesses in his/her vicinity or another geographic area, often in conjunction with online social networking sites or bulletin boards.

SUMMARY

A location-based service is provided that allows a user of a mobile device to tag and track the places he or she visits and share these places with social networking members. To implement this service a system receives location information from the user's location-aware mobile device over a wireless network. The location information identifies various locations or other points-of-interest that the user has visited. Based on this information the system determines a geographical domain that encompasses at least some of the locations the user has visited. Once a geographic domain has been determined it is presented to the user via the mobile device. The user is prompted via the mobile device to tag the geographical domain with an annotation that describes the geographic domain. The system stores the geographical domain and the annotation associated therewith so that it can be searched and accessed or retrieved by the user or members of the user's social network.

In one illustrative example the prompt provided to the user may include a list of possible annotations from which the user can choose. The possible annotations may be presented in an order based on the frequency at which other users have tagged the same or an overlapping geographic domain with those annotations. By prompting the user in this manner the user can simply and conveniently keep track of the locations and other points-of-interest that he or she has visited.

In another illustrative example a member of a social networking group can use his or her own mobile device to search the geographic domains and their tags of other members of the group. In this way members can pose various queries concerning the places their friends and other contacts visit. For instance, a member can easily find out where other members live, work, eat, and shop.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Location-based services and online social networking sites can be used to recommend a location or point of interest that has been visited by a user for socializing, information gathering, and other activities. Such recommendations can be valuable because people tend to trust others who possess a common bond. Thus, a person might trust their family members for a recommendation of a good restaurant, an interesting shopping area, or a place for entertainment before they would rely on a suggestion from a complete stranger. For instance, when a person is traveling, they might ask associates such as business contacts and the like where are good places to stay and to eat. This is especially true when a person ventures into unknown locations and is no longer surrounded by familiar things. Thus, being able to easily obtain information about places and events from trusted sources can be extremely valuable.

One problem with the aforementioned location-based services is that the user of a location-aware mobile device who wishes to share points-of-interest or other locations that the user has visited generally needs to actively perform a number of steps before this information can be shared. For instance, the user may need to keep track of the various locations visited, upload them to a social networking site, and identify those locations by a descriptive name or other annotation so that they will be recognized by members of the user's social group or groups as a location they themselves may wish to visit. Unfortunately, users can be discouraged from sharing this information because they do not want to take the time or effort needed to perform these steps, which can be inconvenient and intrusive.

Figure 1:
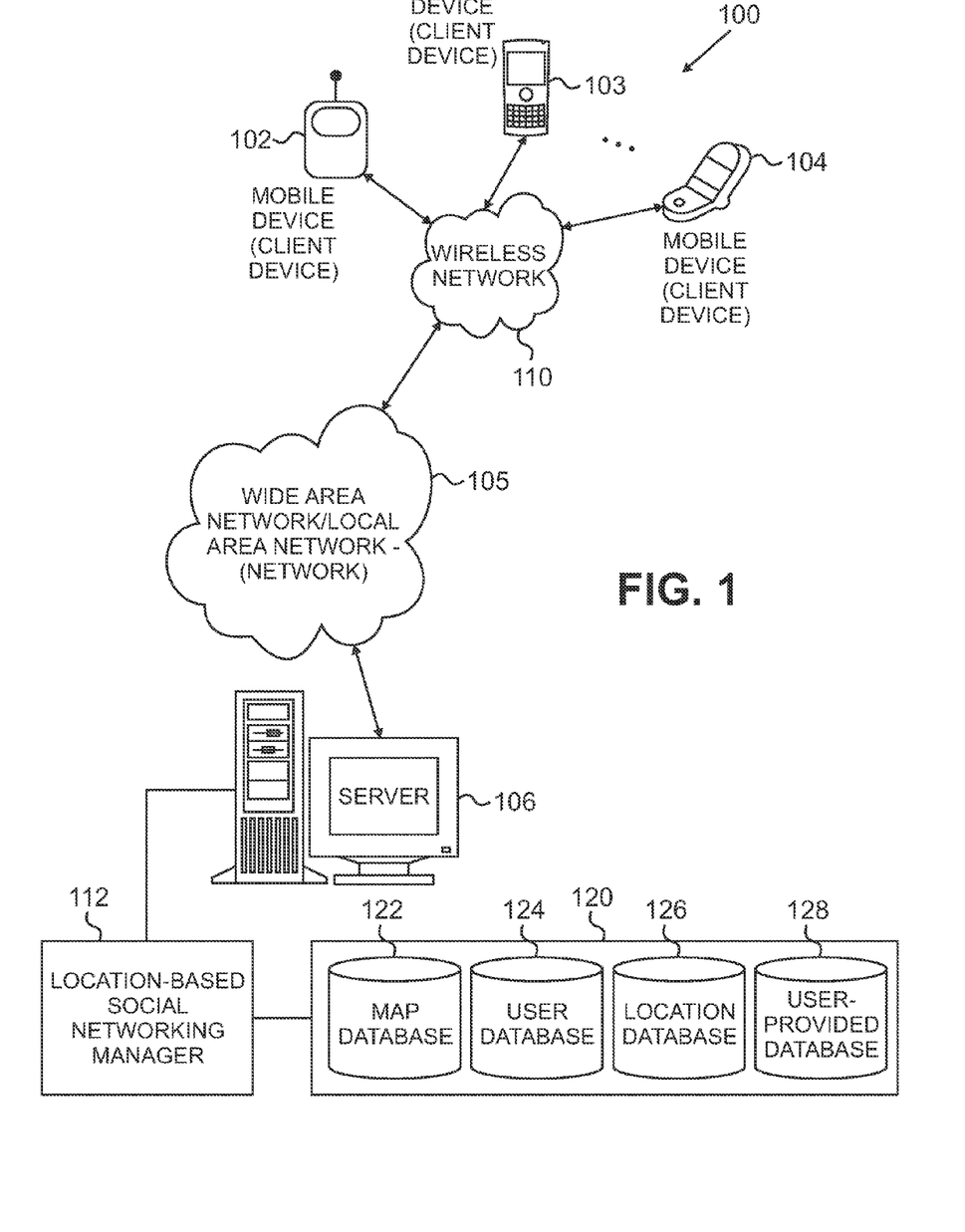
FIG. 1 is a system diagram of one illustrative example of an operating environment in which a mobile user can tag and track the places he or she visits and share these places with social networking members.

Turning now to FIG. 1, shown therein is a system diagram of one illustrative example of an operating environment in which a mobile user can tag and track the places he or she visits and share these places with social networking members. The mobile user can also search tags provided by other social networking members to identify places they visit. As used herein, the terms "social network" and "social community" refer to an individual's personal network of friends, family colleagues, coworkers, and the subsequent connections to other individuals within those networks, which can be utilized to find relevant connections for a variety of activities, including, but not limited to job networking, service referrals, content sharing, dating, meeting like-minded individuals or activity partners, or the like.

Referring to FIG. 1, an illustrative communication network 100 includes wireless network 110, wide area networks ("WANs")/local area networks ("LANs") 105, mobile devices 102-104 and location tagging server 106. Mobile devices 102-104 may include virtually any portable computing device capable of communicating over a network, such as network 105, wireless network 110, or the like. Such devices include, for instance, cellular telephones, smart phones, display pagers, radio frequency (RF) devices, infrared (IR) devices, personal digital assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Wireless network 110 may include any system of terminals, gateways, routers, and the like connected by wireless radio links. Wireless network 110 may further employ a plurality of access technologies including $2^{nd}$ generation (2G) and 3rd generation (3G) radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), and Wideband Code Division Multiple Access (WCDMA) and Universal Mobile Telecommunications System (UMTS). Wireless network 110 may include other elements, devices or components not illustrated for sake of brevity.

Network 105 is configured to couple location tagging server 106 and its components with other computing devices, including mobile devices 102-104 through wireless network 110. Network 105 may be, for instance, a public or privately-operated packet-switched network. For purposes of illustration the network 105 is depicted as a packet-switched network operating in accordance with the Internet Suite of protocols and thus, for convenience from time to time, will be referred to herein as the Internet. In some cases network 105 may be eliminated entirely and location tagging server 106 may be in communication with mobile devices 102-104 solely over wireless network 110.

Location tagging server 106 runs a server-side location-based social networking manager process 112. The server 106 may be a centralized server (or cluster of server computers) that maintains the processes and databases for a number of different users, or it may represent a distributed set of computers located in different geographic regions, each serving a different group of users. Data for any of the mobile devices 102-104 may be provided by a data store 120 that is in direct or indirect communication with the server 106 and/or the networks 105 and 110. A separate content provider computer may provide some of the data that is associated with the social networking manager process 112. Although data store 120 is shown coupled to the network server 106, it should be noted that content data may be stored in one or more data stores coupled to any computers or other electronic storage devices in the network, such as a network client or to devices within the network 105 or 110 itself.

The location-based social networking manager process 112 may be used to provide enhanced location information to the user and members of the user's social networking group based on geographic location information obtained from location-aware mobile devices. The location-based social networking manager process 112 contains one or more program components that perform the tasks of displaying location and user profile information related to each mobile communication device that registers or is otherwise entitled to access the service. The process 112 also includes a database manager program that manages the different databases stored in data store 120. It should be noted that the various databases 122 to 128 shown in data store 120 can be organized as separate databases, portions of a single database, or any other logical structure appropriate for storing the data.

Data store 120 stores user information in user database 124. This information relates to each user of a mobile device 102-104 and includes basic account information such as the user's name, an identifier and/or password, security check information, and any other information that may be needed to maintain the user's account and to authenticate and authorize the user. This account also allows each user to define his or her profile and preference data and define the boundaries of interaction with the other users in the system. Location information for each user, such as location histories, frequently visited areas and points-of-interest, and so on, is stored in the location database 126. The location information is determined and transmitted to the server 106 by the mobile device 102-104 in a manner that will be described below.

It should be noted that user information and location information is typically only collected and stored after notice has been provided to the user that the collection of personal information may occur, for example, when signing up to use the location-based service. The notice will also indicate that this information will not be shared with third parties, other than as may be needed to maintain or enhance the quality of the service that is being provided. Other policies that are intended to protect the user's privacy and enhance the quality of the user experience may also be employed. Once the user is informed as to the terms of service, the user will be given an opportunity to consent to the terms of service.

A map database 122 can also be included, which provides the background maps that are displayed on each user's mobile device and corresponds to an area or region in which the user has traveled. In one embodiment, the map images comprise map tiles that are image files of maps with varying degrees of granularity. For example, a map tile of the United States may provide an image of the continental U.S. that can be zoomed to display a regional street level map for any area in the U.S. The maps may be stored locally within the data store 120 so that they may be provided by the server 106 to the appropriate mobile device 102-104. Alternatively, the maps may be provided by a third party map provider. Other databases storing information relating to the users of the system and the areas of their operation can also be included in data store 120, such as an events database, a points-of-interest database, a store or recreation finder database, and the like.

The location-based social networking manager process 112 allows a user to store in user-provided database 128 information relating to acquaintances, friends, family, or other contacts (hereinafter collectively referred to as "friends"), as well as other items of interest, such as points-of-interest, events of interest, and possibly any other items that have a geographic and/or time context with respect to the interests of the user. The information in this database can be organized in any number of ways. For instance, a grouping function allows the user to define specific sub-groups of friends to facilitate the location of domains for select people out of the total number of friends. Thus, friends and acquaintances can be grouped into different categories to allow easier identification.

The database components shown in FIG. 1 are not necessarily exhaustive. Additional database components may be employed in various implementations, and fewer database components may be employed in other implementations. Moreover, the database components are not necessarily separate databases, or discretely implemented, but may be implemented, for example, as different sets of tables in a single, extensive relational database, or may be implemented as two or more databases of various types residing locally or remotely. In addition, the types of stored information and databases discussed above may instead be obtained by secondary searching of various information sources, including the world-wide web, electronic information streams, and various types of broadcast information.

Figure 2:
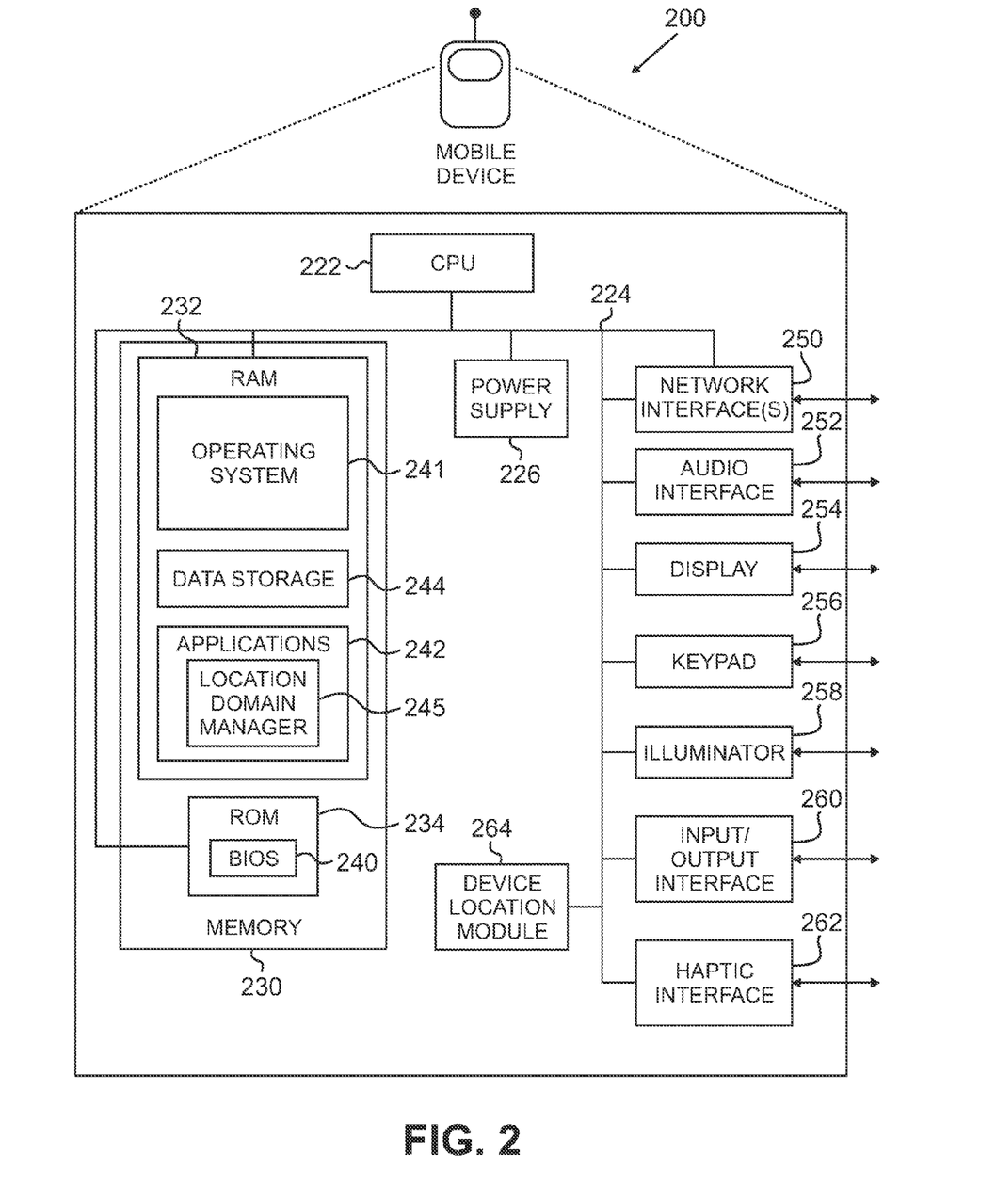
FIG. 2 shows one illustrative example of a mobile device.

FIG. 2 shows one illustrative example of a mobile device 200. Mobile device 200 may include many additional or fewer components than those shown in FIG. 2. Mobile device 200 may represent, for example, mobile devices 102-104 of FIG. 1. As shown, mobile device 200 includes a central processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and a device location module 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless application protocol (WAP), ultra wide band (UWB), IEEE 802.16 Worldwide Interoperability for Microwave Access (WiMax), session initiation protocol/real-time transport protocol (SIP/RTP), or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

The device location module 264 allows the mobile device 200 to determine its own geographic location so that the location of the user operating the device can be presented on a map displayed on the device, as well as on the mobile devices of other users in the network. As discussed above, the location information for the mobile device 200 is transmitted and stored in the location database 126 associated with server 106 of the network. The location information for a given user can be subsequently transmitted from the server 106 to selected members of the user's social network based on the filters and preferences established by the given user.

In one implementation, device location module 264 may be a global positioning system (GPS) receiver. GPS receivers are capable of updating a device's location on a real or near real-time basis. The location is typically represented in terms of the physical coordinates of the mobile device 200 on the surface of the Earth, which typically outputs a location as latitude and longitude values. The GPS receiver can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth.

It is understood that under different conditions, device location module 264 can determine a physical location within millimeters for mobile device 200; and in other cases, the determined physical location may be less precise, such as within a meter or significantly greater distances. In some implementations, however, mobile device 200 may also, through other components, provide other information that might be employed to determine a physical location of the device, including for example, a MAC (medium access control address, IP (Internet Protocol) address, or the like.

Mass memory 230 includes a RAM (random access memory) 232, a ROM (read only memory) 234, and perhaps other storage media. Mass memory 230 illustrates an example of computer storage media for storage of information such as computer readable instructions, data structures, program modules or other data. Mass memory 230 stores a basic input/output system (BIOS) 240 for controlling low-level operation of mobile device 200. The mass memory also stores an operating system 241 for controlling the operation of mobile device 200. The operating system may include, or interface with, a Java virtual machine module that enables control of hardware components and/or operating system operations via Java application programs.

Memory 230 further includes one or more data storage media 244, which can be utilized by mobile device 200 to store, among other things, applications 242 and/or other data. For example, data storage media 244 may also be employed to store information that describes various capabilities of mobile device 200. The information may then be provided to another device based on any of a variety of events, including being sent as part of a header during a communication, sent upon request, or the like. Moreover, data storage media 244 may also be employed to store social networking information including a user profile and the like. Such social networking information may be accessible to the location domain manager 245, described below.

Applications 242 located in memory 230 may include computer executable instructions which, when executed by mobile device 200, transmit, receive, and/or otherwise process messages (e.g., SMS, MMS (multimedia messaging service), IM (instant message), email, and/or other messages), audio, video, and enable telecommunication with another user of another client device. Other examples of application programs include calendars, browsers, email clients, IM applications, SMS applications, VOIP (voice over Internet protocol) applications, contact managers, task managers, transcoders, database programs, word processing programs, security applications, spreadsheet programs, games, search programs, and so forth.

One application that may be stored in memory 230 is location domain manager 245. Although illustrated in FIG. 2 as an application, location domain manager 245 may also be implemented, for instance, as a component of operating system 241.

Figure 3:
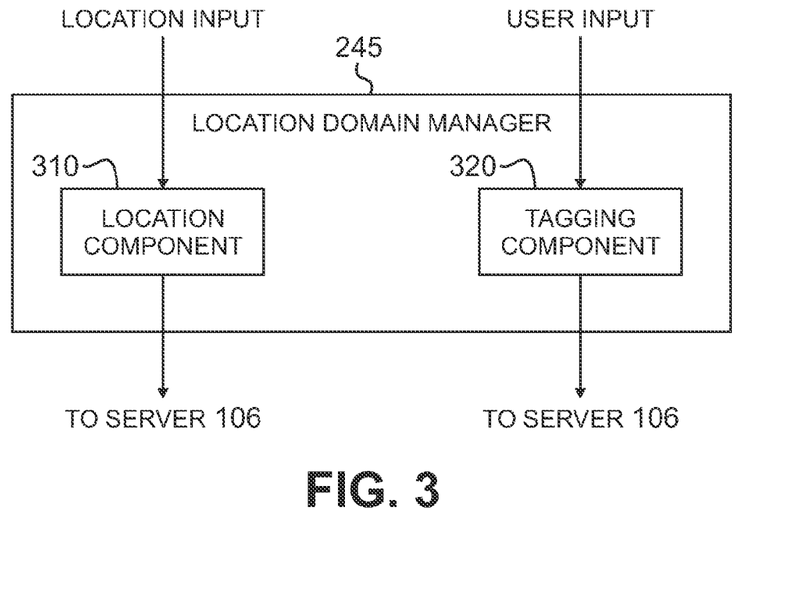
FIG. 3 shows two components of one illustrative example of the location domain manager included in the mobile device of FIG. 2.

FIG. 3 shows two components of one illustrative example of the location domain manager 245: location component 310 and tagging component 320. Location component 310 is configured to transmit location information for the mobile device 200 to the server 106 for storage in location database 126. The location information may be provided to the location component 310 directly by device location module 264 or indirectly from the memory 230, which can store the location information obtained by device location module 264.

The location information can be communicated to the server 106 in a "pull" model, in which the location is transmitted when requested by the social networking manager process 112 in server 106. Alternatively, the information can be provided to the server 106 in a "push" model in which the mobile device sends relevant location information to the server 106 on some periodic basis such as a fixed time interval or on some other basis that may be determined, for instance, on one or more user conditions. Of course, in some cases a combination of both a push and pull model may be employed.

In a pull mode of operation, the server 106, under instructions from location social networking manager process 112, can poll the various mobile devices 102-104 in order to obtain the location information. While polling may be performed at a fixed interval, for systems with a large number of mobile devices, polling each device in this manner could result in an overwhelming amount of network traffic. To minimize the power usage and network and processing overhead, in one example the server 106 may employ a polling method that polls the device location of each mobile device in the system as infrequently as possible to thereby impose a minimum load on the carrier networks.

This polling method may be an iterative polling method that employs a caching mechanism that updates a user's location based on known location information and user behavior. Instead of polling each mobile device in the network at a fixed frequency, the frequency of the polling for each device may depend on the movement and/or activity (e.g., interaction with the server) of the user. If the user is stationary and inactive the polling frequency is minimized to result in fewer location polls. If a user is on the move and/or interacting with the server, the polling frequency is increased to result in more frequent location polls.

Tagging component 320 of location domain manager 245 allows for location annotation or tagging in which user-provided digital text and/or digital images are associated with a physical location. That is, tagging ties a user annotation to a specific location. Tagging component 320 may optionally allow for event type tagging, which is a specialized tag where an annotation is associated with a location and time combination (e.g., a yearly music festival). The annotations can include, but are not limited to, text, temporal information, and/or media, and the like. Media can include, but is not limited to, photographs, video, audio, and/or graphics, and the like.

Figure 4:
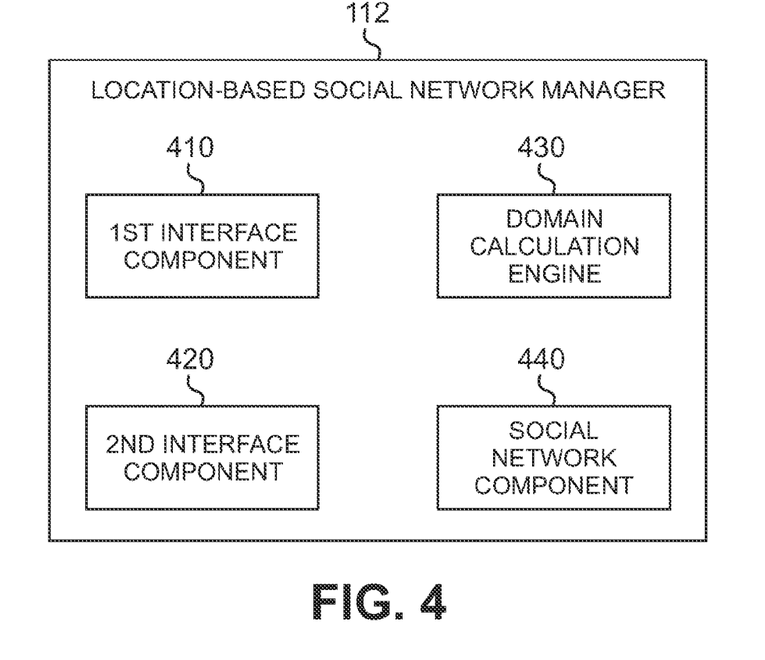
FIG. 4 shows one illustrative example of the software components of the location-based social networking manager shown in FIG. 1.

FIG. 4 shows one illustrative example of the software components of the location-based social networking manager process 112. It should be noted, however, that in some implementations these components may not be implemented exclusively in software but rather may be implemented in hardware, firmware, or a combination of software, hardware, and firmware. The location-based social networking manager process 112 includes first interface component 410, second interface component 420, domain calculation engine 430, and social network component 440.

The first interface component 410 receives the location information from the various location-aware mobile devices in a push or pull mode in the manner described above. The first interface component 410 in this example is configured to expose an API (application programming interface) to facilitate the collection of the location information as well as other information from the mobile devices.

Once a user's device has transmitted some minimum number of location data points to the location tagging server 106, the domain calculation engine 430 attempts to determine a domain that those location points represent. As used herein, a domain is a geographic area or region that encompasses selected location data points that a user has visited. A domain is typically, though not necessarily, the smallest geographic area or region that encompasses the selected location data points. The location data points that are used in calculating a domain may or may not include every location data point that the domain calculation engine 430, via server 106, has received from the mobile device.

For instance, in some cases, locations that have not been visited within some predetermined period of time (e.g., 1 year) can be filtered out, as can locations that for one reason or another clearly do not belong in the domain based on such factors as statistical analysis or user input, for instance. That is, in the latter case the user may be able to manually exclude certain locations that are not to be used in calculating a domain. While a domain may have any shape, for sake of simplicity, the following example will assume that the domain is to be represented as a circle.

The domain calculation engine 430 may calculate domains using a variety of different techniques and algorithms. One such technique will be presented herein for the purposes of illustration only and should not be construed as a limitation on the concepts, methods, and systems disclosed herein. In this example, the domain calculation method has two input parameters whose values may be pre-established and fixed, or which may be user selectable. The first parameter is the minimum number of location data points $N_{min}$ needed to calculate a domain. The other parameter is the maximum radius of the domain, which is denoted $R_{max}$.

Figure 5A:
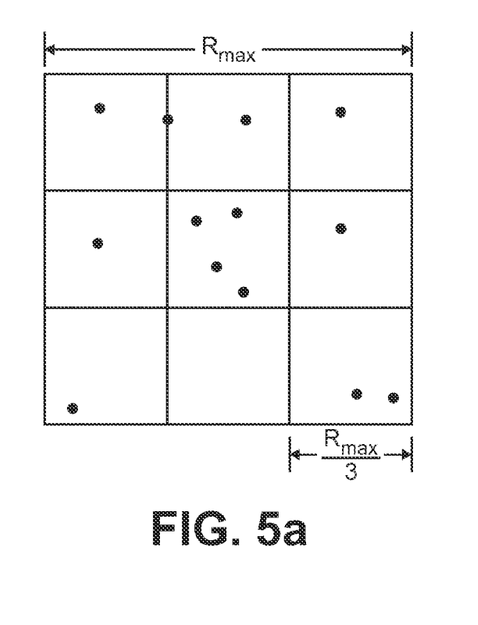
FIGS. 5a-5c show one illustrative technique that may be used to determine geographic domains from location information.

The following visual presentation illustrates how location data points are clustered in order to calculate a domain. Of course, the located-based social networking manager process 112 will typically perform this clustering process in a strictly numerical fashion without the need to actually plot location data points for display. As shown in FIG. 5a, a series of location data points are placed in a square whose sides have a length $R_{max}$. The position of each data point on the display is determined by its physical coordinates so that the relative positions of the data points with respect to one another on the display reflect their actual relative positions on Earth.

The square is subdivided into nine smaller squares, each with a length $R_{max}/3$. In this example $N_{min}$ is assumed to be 5. If any small square contains a number of data points greater than $N_{min}$, then those data points can be clustered so as to define a single domain. In the present example, none of the squares contain more than five data points. In this case the small squares are aggregated with one another until a cluster is obtained with more than five data points.

Figure 5B:
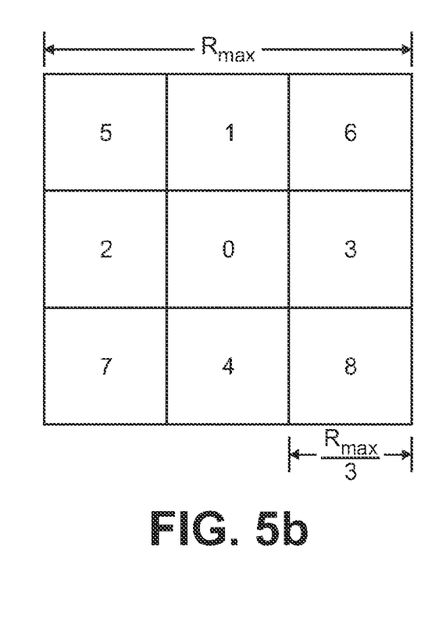

FIG. 5b shows one example of how the squares may be aggregated with one another. That is, the number in each square represents the order in which the squares are aggregated together. Starting with the centermost square, the data points in this square are added to data points in the square immediately above it. If the total number of data points is still less than or equal to $N_{min}$, as it is here, then the data points in the square to the left of the centermost square are added to the cluster.

In this example these three squares now include a total of six location data points, which is greater than the number needed to form a cluster from which a domain can be calculated. Accordingly, these six points will be used to calculate a domain. If, however, the total number of data points were still less than $N_{min}$, then the location data points in additional squares would be added to the cluster in the order shown in FIG. 5b.

Figure 5C:
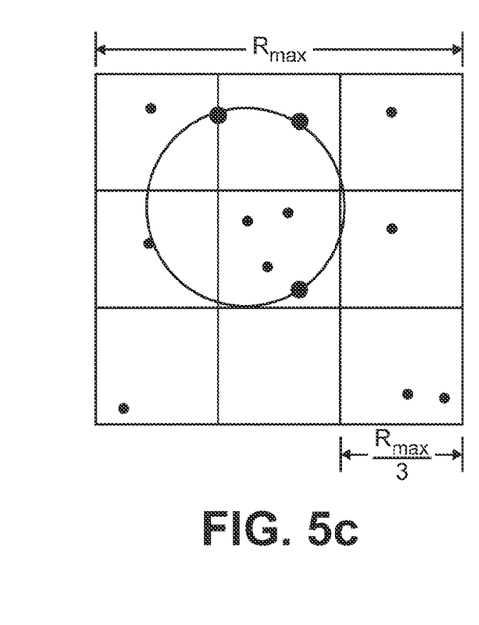

The domain can be calculated by the domain calculation engine 430 from the location data points in the cluster using any appropriate algorithm. As previously mentioned in some implementations the domain may be represented as a circle having the smallest diameter that can encompass all the location data points in the cluster. In this case one example of a suitable algorithm is the Elzinga-Hearn algorithm, which is described, for example, in D. Jack Elzinga, Donald W. Hearn, "*Geometrical Solutions for some minimax location problems*," Transportation Science, 6, (1972), pp 379-394. One example of a software routine for implementing this algorithm is available at http://www.delphiforfun.org/programs/circle_covering_points.htm. The domain that results when this algorithm is applied to the cluster of data points defined above is shown in FIG. 5c.

As the user continues to use the location tagging service by sending location data points to the server 106, additional location data points can be added to the user's pre-existing domains. In particular, a new data point is added to the closest one of the existing domains and the domain calculation algorithm is once again executed for all the data points in the domain, including the newly added data point. If the resulting domain has a radius less than $R_{max}$, then the newly added data point may remain in that domain. If this and possibly other constraints are not satisfied, then the data point can be added to another pre-existing domain. If none of the pre-existing domains can accommodate the newly added data point while meeting any constraints that are imposed, then the newly added data point can be reserved for a potential new domain in the future.

Once a domain has been identified the user is asked to tag the domain using the tagging component of the location domain manager 245 located on the user's mobile device. The second interface component 420 of the location-based social networking manager process 112 requests the user to provide the tag by sending a prompt to the mobile device. In one implementation, the prompt may include a map of the domain that can be displayed on the mobile device.

Figure 6:
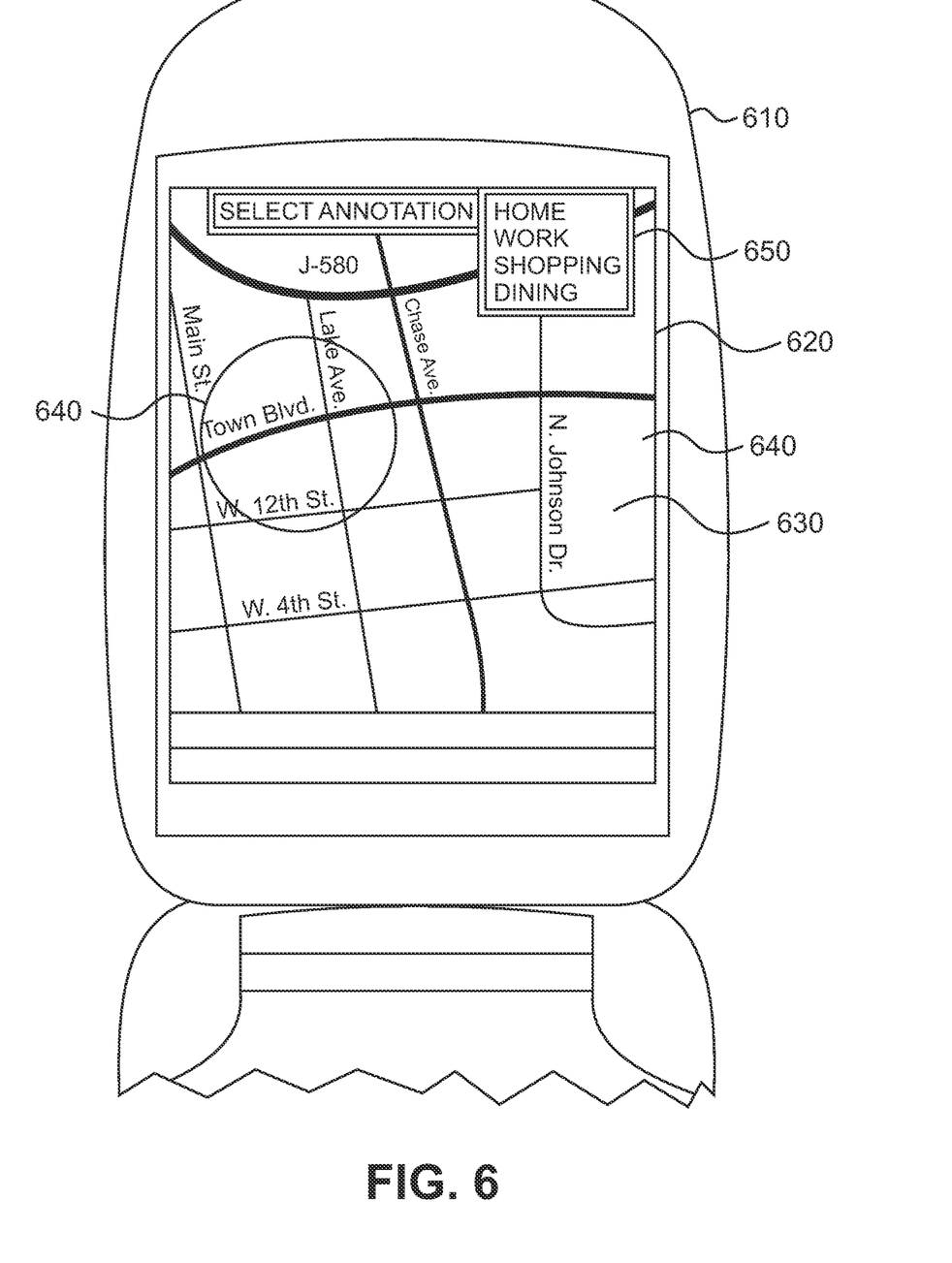
FIG. 6 shows a mobile device displaying a map on which a geographic domain is superimposed.

FIG. 6 shows a mobile device, illustrated as mobile phone 610, which has a display 620. A map 630 is presented on the display 620. Superimposed on the map 630 is a domain 640, which is represented by a solid circular line. As also shown in FIG. 6, the prompt may also include a user selectable list 650 of commonly used annotations from which the user may select an appropriate tag for the domain. Examples of such annotations may include "home," "work," "shopping," "dining," "school," "sports," and the like.

An option may also be provided to allow the user to enter an annotation that is not listed among the tags that have been provided. The user selectable list may be presented as a drop-down menu in order to maximize the space that is available to display the map 630. Alternatively, the user selectable list 650 may be displayed shortly after the map 630 is displayed so as to not obstruct the map and to allow the annotations to be presented in a larger font. Of course, the manner in which the map and annotations are presented as part of the prompt may vary from implementation to implementation and may in part depend on the capabilities of the mobile device, some of which may have larger displays than others.

In some implementations the order in which the annotations appear in the user selectable list 650 may be determined in whole or in part by how other users have tagged the same or a similar (e.g., overlapping) domain. That is, the more frequently a certain annotation has been used to tag a certain domain, the higher up in the list that annotation will appear. For instance, if many users have tagged an area with the annotation "shopping," then when another user visits locations within this same area and is thus presented with the same or similar domain, the first item appearing in the user-selectable list may be "shopping." In this way the user will often be able to tag a domain using one of the first few items presented in the user-selectable list, thereby simplifying the process for the user and thus making it more likely that he or she will take the time to tag the domain.

The map displayed on the user device may be generated by a map generator that is located on the server 106 and which uses the data in map database 122. The map generator may be a part of the second interface component 420 or it may be a separate component or application that is called by the second interface component 420. The map image data is then communicated to the mobile device by the second interface component 420 so that it can be displayed.

Alternatively, the server 106 may communicate the physical coordinates of the map and the domain to the mobile device, which may run a local map generator. In one embodiment, each mobile communication device runs a local client version of the map generator and database manager components. Such a component or components may be, for example, a thin-client program, such as a Java program, running on a mobile device, which utilizes the data provided in map database 122.

The domains that a given user visits may also be shared with other users such as those users specified as friends or other contacts in the user's account or profile stored in the user-provided database 128 shown in FIG. 1. The user-provided database 128 is managed and accessed by the social network component 440 of the location-based social networking manager process 112 shown in FIG. 4. In this way friends can determine where other friends travel and what they often do in those places. For instance, a user may want to determine who has often visited a certain area. This query can be posed by the user through the user interface associated with the location domain manager 245 located on the user's mobile device.

This query is communicated to the location-based social networking manager process 112, which then searches the geographic domains of the given user's friends stored on database 128 to identify those domains that intersect or overlap with the given user's geographic domain. This searching function may be performed by a search engine associated with any appropriate component of the location-based social networking manager process 112 such as the social network component 440. These domains and their associated tags can then be communicated to the given user's mobile device, where they can be displayed or otherwise presented to the user in any appropriate format.

Users may also pose other types of queries regarding the areas or regions that their friends visit. For instance, a user may wish to know if any of his or her friends live nearby. Upon receipt of this query the server 106 searches the friends' tags to identify those having the annotation "home." Those domains meeting this criterion are then compared to the user's domain that is tagged "home," and those that are nearby (e.g., within a specified distance) or overlap with the user's home domain will be communicated to the user on the user's mobile device. Of course, other type of queries may be posed. Illustrative queries include "who often shops in the same places as me," and "who works nearby." Other queries may include a temporal component, such as a query for an event, if such information has been included with the annotations.

While the social network component 440 is shown as a part of the location-based social networking manager process 112, those of ordinary skill in the art will recognize that the functionality of this component may be performed by a separate application or applications. For instance, different providers can support the social networking applications. For example, one application can be Facebook™ while another can be Microsoft Live Spaces™, etc.

Because the location-based social networking manager stores and provides access to sometimes sensitive personal information of a user to a network of people, certain security and privacy measures are included to allow the user to control who has access to this information. Through a privacy preference utility, the user may define which characteristics can be shared with others within his or her social network, and set filters to limit access of certain information to only certain users.

For example, the user can specify which user or group of users within the network can see the location of the user by defining a "blacklist" of users who are not allowed to see the location information. User characteristics whose access may be limited can include the user's location information as well as profile and network interaction information. Some of the security functions include the ability to turn off the location sharing so that the location of the mobile device is not broadcast and cannot be determined by other mobile device users.

The location sharing on/off feature can be triggered through the website, a mobile application, a customer service call, or via an SMS message, or the like. If the mobile communication device is lost or otherwise compromised, the user can disable access to the service by expiring the session ID and wiping all information from the device by means of an appropriate message or signal to the device.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a machine-readable computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize that many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for providing enhanced location information concerning a mobile user, the method comprising the steps of:
receiving information from a mobile device of a user identifying a plurality of locations the user has visited;
filtering out locations from the received information that the user has not visited within a predetermined period of time;
clustering at least a predefined minimum number of the filtered locations that are all located within a predefined distance of one another, the predefined minimum number being equal to at least two;
determining a geographical domain that encompasses at least the predefined minimum number of clustered and filtered locations the user has visited;

presenting the geographical domain to the user via the mobile device;

prompting the user via the mobile device to tag the geographical domain with an annotation, the clustering being performed in a manner so that each of the predefined minimum number of locations in the geographical domain commonly shares the annotation, the prompting including presenting a list of predefined annotations from which the user may choose to describe the geographical domain; and storing the geographical domain and the annotation associated therewith for subsequent retrieval.

2. The method of claim 1 in which the geographic domain has an area that is a minimum while still encompassing said at least some of the plurality of locations.

3. The method of claim 1 further comprising pushing said information from the mobile device over a wireless network.

4. The method of claim 1 further comprising pulling said information from the mobile device over a wireless network.

5. The method of claim 1 in which the possible annotations are presented in an order based at least in part on a frequency at which other users have tagged the same or an overlapping geographic domain with possible annotations.

6. The method of claim 1 in which the plurality of locations are identified by their geographic coordinates.

7. The method of claim 1 in which the user has a profile specifying at least one social networking member authorized to receive enhanced location information associated with the user and further comprising presenting the geographic domain and the annotation associated therewith to the social networking member in response to a request from the social networking member.

8. The method of claim 7 in which the geographical domain is presented as an area defined on a map that is displayed on a second mobile device associated with the social networking member.

9. A method for providing enhanced location information concerning social networking members, the method comprising the steps of:

receiving over a communication network a request from a member of a social networking group to obtain geographic information concerning other members of the social networking group;

based on the request, from a plurality of visited points-of-interest, filtering out points-of-interest that at least one other member of the social networking group has not visited within a predetermined period of time, using a domain calculation engine to determine at least one geographical domain that encompasses a predefined minimum number of filtered points-of-interest that at least one other member of the social networking group has visited, the predefined minimum number being equal to at least two, the domain calculation engine determining the at least one geographical domain by clustering at least the predefined minimum number of filtered points-of-interest that are all located within a predefined distance of one another; and communicating over a communication network the geographical domain information and an annotation pertaining to the geographical domain to the member of the social networking group, the clustering being performed in a manner so that each of the predefined minimum number of locations in the geographical domain commonly shares the annotation, the geographical domain being tagged with the annotation by at least one member of the social networking group by choosing from a list of predefined annotations presented as a prompt displayed on a mobile device to describe the geographical domain.

10. The method of claim 9 further comprising the steps of:

receiving location information for the plurality of points-of-interest from location-aware mobile devices of the other members of the social networking group;

based on the location information, determining geographical domains that encompass at least some of the plurality of points-of-interest each of the other members has visited;

presenting their geographical domains to each respective other member via their respective location-aware mobile device;

prompting the other members via their respective location-aware mobile devices to tag the geographical domains with an annotation; and storing the geographical domains and their respective annotations for subsequent retrieval.

11. The method of claim 10 further comprising clustering the location information from each of the other users so that a plurality of constraints are satisfied.

12. The method of claim 11 in which the constraints include a minimum number of points-of-interest and maximum distance between any two points-of-interest in a cluster.

13. The method of claim 9 in which the request includes a query and further comprising determining the at least one geographical domain by searching tags associated with a plurality of geographic domains using text obtained from the query.

14. A location-based social networking manager comprising the following computer-implemented components:

a first interface component for receiving information obtained from a location-aware mobile device of a user identifying a plurality of points-of-interest the user has visited;

a domain calculation engine for (i) from the identified plurality of points-of-interest, filtering out points-of-interest that the user has not visited within a predetermined period of time, (ii) clustering at least a predefined minimum number of the filtered points-of-interest that are all located within a predefined distance of one another, the predefined minimum number being equal to at least two and (iii) determining one or more geographic domains based on the information obtained from the mobile device of the user, wherein at least one of the geographic domains encompasses at least the predefined minimum number of the filtered points-of-interest that the user has visited within the predetermined period of time;

a second interface component for prompting the user of the mobile device for an annotation describing each of the one or more geographic domains, the prompting including presenting a list of predefined annotations from which the user may choose to describe the at least one geographic domain, the clustering being performed in a manner so that each of the predefined minimum number of points-of-interest in the geographical domain commonly shares the annotation; and a social network component for storing user profiles specifying members of a social network associated with the user who are authorized to receive, upon request, the one or more geographic domains and the annotations associated therewith.

15. The location-based social networking manager of claim 14 in which the first interface component is configured to pull the information from the location-aware mobile device.

* * * * *